(12) United States Patent
Peries (10) Patent No.: US 9,676,262 B2
(45) Date of Patent: Jun. 13, 2017

(54) PROTECTIVE VEHICLE COVER

(71) Applicant: Prasanna S. Peries, Castaic, CA (US)

(72) Inventor: Prasanna S. Peries, Castaic, CA (US)

(*) Notice: Subject to any disclaimer, the term of this patent is extended or adjusted under 35 U.S.C. 154(b) by 187 days.

(21) Appl. No.: 14/524,787

(22) Filed: Oct. 27, 2014

(65) Prior Publication Data

US 2015/0114533 A1    Apr. 30, 2015

Related U.S. Application Data

(60) Provisional application No. 61/896,480, filed on Oct. 28, 2013.

(51) Int. Cl.
*B65D 65/02* (2006.01)
*B60J 11/08* (2006.01)

(52) U.S. Cl.
CPC ..................... *B60J 11/08* (2013.01)

(58) Field of Classification Search
CPC ........................................................ B60J 11/08
See application file for complete search history.

(56) References Cited

U.S. PATENT DOCUMENTS

| | | | | |
|---|---|---|---|---|
| 3,042,111 A * | 7/1962 | Wytovich | ............... | B60J 11/08 150/168 |
| 3,046,048 A * | 7/1962 | Cheney | .................... | B60J 11/08 160/352 |
| 3,391,724 A * | 7/1968 | Charlesworth | .......... | B60J 11/08 160/370.21 |
| 5,435,362 A * | 7/1995 | Chiang | .................... | B60J 11/00 150/166 |
| 5,615,923 A * | 4/1997 | Madison | .................. | B60J 11/08 160/370.21 |
| 6,070,629 A * | 6/2000 | Whiteside | ................ | B60J 11/00 150/166 |
| 6,289,968 B1 * | 9/2001 | Karten | .................... | B60J 1/2091 160/370.21 |
| 7,431,375 B1 * | 10/2008 | Julius | ....................... | B60J 11/06 150/168 |
| 7,673,924 B1 * | 3/2010 | Lau | .......................... | B60J 11/08 296/95.1 |
| 7,699,380 B2 * | 4/2010 | Coleman | .................. | B60J 11/06 150/166 |
| 8,387,676 B2 * | 3/2013 | Hunckler | ................. | B60J 11/08 160/105 |
| 9,150,088 B2 * | 10/2015 | Yang | ........................ | B60J 11/08 |
| 2009/0301671 A1 * | 12/2009 | Locklear | .................. | B60J 11/08 160/370.21 |

* cited by examiner

*Primary Examiner* — Tri Mai (57) ABSTRACT

A protective vehicle cover is a device that is placed over the windshield or other window of a vehicle in order to protect the vehicle interior from damage due to sunlight and heat. The protective vehicle cover features a multilayer shield that repels liquid and reflects sunlight as well as an at least one intermediate layer that provides additional functions such as increasing the weight and facilitating handling of the protective vehicle cover. The protective vehicle cover is magnetically secured to metallic portions of the vehicle's roof, hood, left strut, and right strut. At least one securing flap and at least one magnetic fastener are utilized to further secure the protective vehicle cover to both the interior and the exterior portions of the vehicle's windshield or windows. The at least one securing flap is folded into the interior of the vehicle and magnetically secured in place.

18 Claims, 13 Drawing Sheets

PROTECTIVE VEHICLE COVER

The current application claims a priority to the U.S. Provisional Patent application Ser. No. 61/896,480 filed on Oct. 28, 2013.

FIELD OF THE INVENTION

The present invention relates generally to a flexible cover that is utilized to protect a vehicle interior. More specifically, the present invention is a protective vehicle cover that is attached to a vehicle windshield or window in order to protect the vehicle interior from damage due to long-term exposure to sunlight. The present invention is additionally capable of protecting the windshield from snow, sleet, and other forms of precipitation, as well as ice accumulation on the windshield due to precipitation and climate.

BACKGROUND OF THE INVENTION

Vehicles are a considerable investment for a majority of consumers. However, vehicles are subject to considerable depreciation in value. Depreciation can result due to a variety of reasons such as vehicle mileage. Any normal wear and tear resulting from normal usage of a vehicle can further depreciate the vehicle as well. Damage from sunlight is a large contributor to vehicle depreciation. The light and heat entering a vehicle through the vehicle's windshield and windows can cause significant damage to the vehicle's interior, particularly to leather upholstery. Sun damage is a legitimate concern in all regions due to the ability of ultraviolet rays to penetrate all but the thickest of cloud cover. The presence of clouds may even exacerbate the damage from ultraviolet radiation as the clouds may reflect the ultraviolet rays and potentially increase the amount of radiation. Due to the ability of ultraviolet rays to penetrate the atmosphere even on overcast days and in the winter, sun damage is a concern in all regions of the world.

Conventional means of protecting a vehicle against sun damage include the use of a physical barrier to block sunlight. Sunshades are commonly deployed within a vehicle adjacent to the windshield and are favored due to their light weight, inexpensiveness, and compactness when folded and not in use. Sunshades are convenient due to their ease of use. However, heat and light are still able to penetrate a windshield covered by a sunshade as the sunshade is deployed within the vehicle interior. As such, the vehicle interior is subject to heating up, causing long term damage to the vehicle interior. Additionally, sunshades are generally placed upon the vehicle dashboard and only offer protection against sunlight penetrating through the vehicle windshield. As such, sunlight is able to enter the vehicle interior through the vehicle's other windows. There is generally a need for a means of protecting a vehicle from sunlight that may be placed externally on the vehicle in order to provide greater protection against sunlight.

The present invention is a protective vehicle cover that is externally mounted to a vehicle to protect the vehicle interior against damage from the sun's ultraviolet rays. The present invention is magnetically mounted to the exterior of the vehicle. The present invention is water resistant and is additionally capable of blocking ultraviolet rays from entering the vehicle interior. The magnetic means of mounting the present invention to the vehicle exterior greatly reduces the likelihood of the present invention being forcibly removed from the vehicle due to the elements. In addition to protecting the vehicle interior from sun damage, the present invention is additionally able to protect the windshield from ice accumulation due to snow, sleet, and other factors relating to precipitation and climate.

DETAIL DESCRIPTIONS OF THE INVENTION

All illustrations of the drawings are for the purpose of describing selected versions of the present invention and are not intended to limit the scope of the present invention.

The present invention is a protective vehicle cover that is utilized to protect the interior of a vehicle from damage due to sunlight and heat. With reference to FIGS. 1-4, the present invention comprises a multilayer shield 1, at least one securing flap 10, and at least one magnetic fastener 11. The multilayer shield 1 prevents sunlight from penetrating the present invention into the vehicle interior. Additionally, the multilayer shield 1 is impermeable to precipitation. The at least one securing flap 10 is utilized to secure the present invention to both the interior and the exterior of a vehicle. The at least one magnetic fastener 11 is utilized to magnetically hold the present invention in place on various metallic portions of the vehicle or onto other parts of the present invention.

Figure 1:
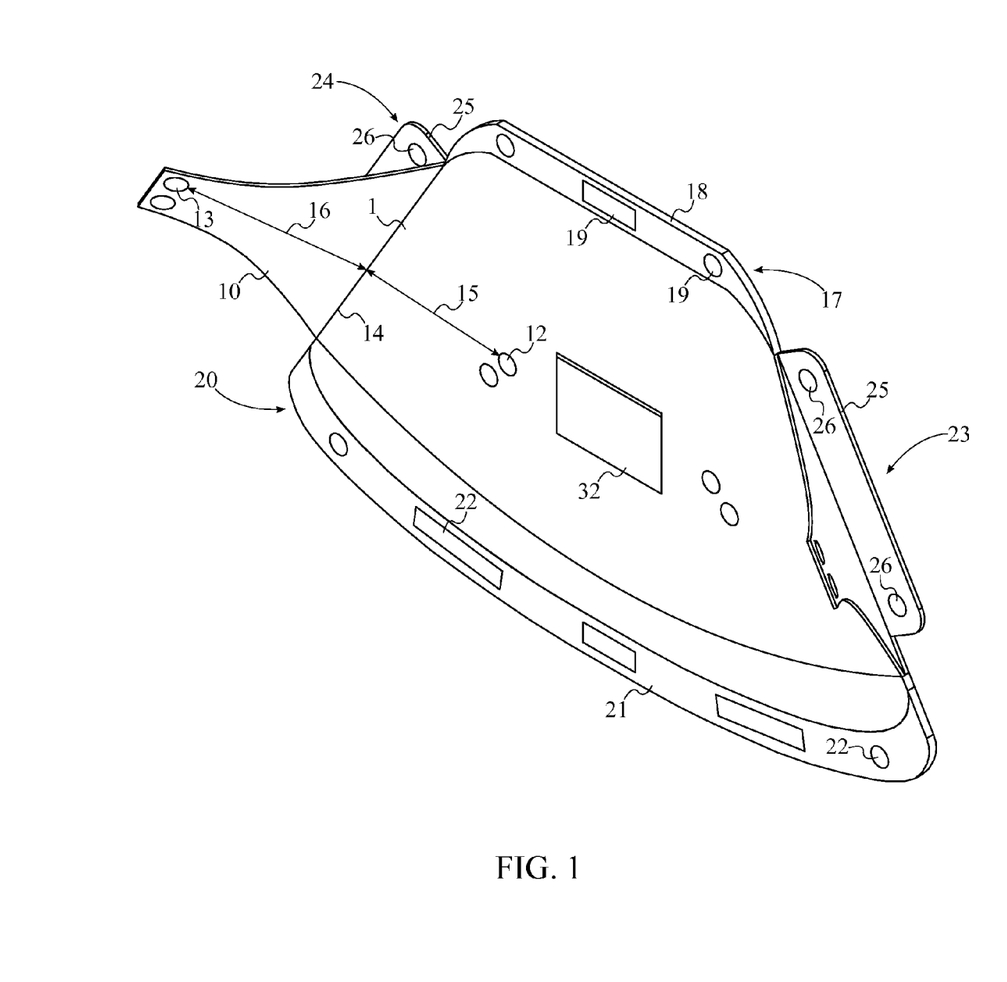
FIG. 1 is a perspective view of the present invention.
Figure 2:
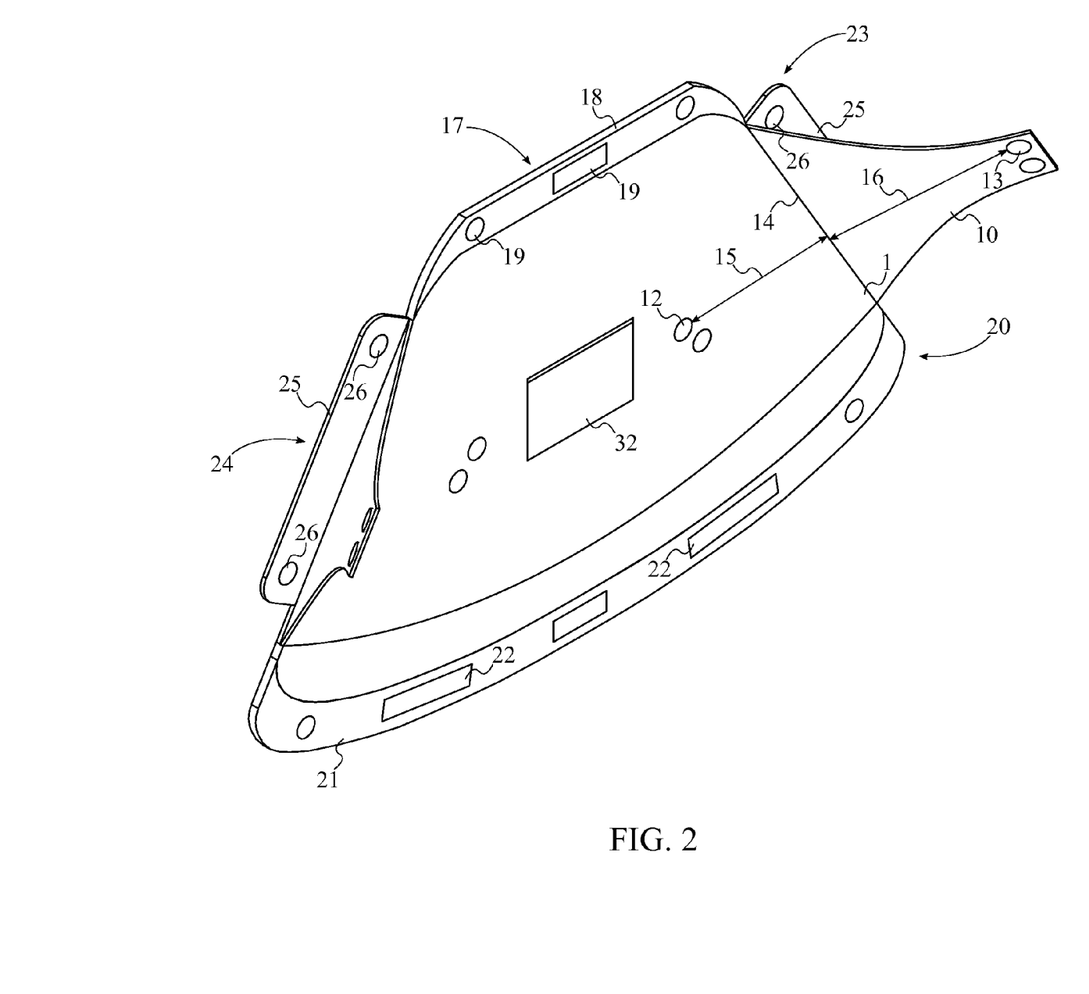
FIG. 2 is an alternate perspective view of the present invention.
Figure 3:
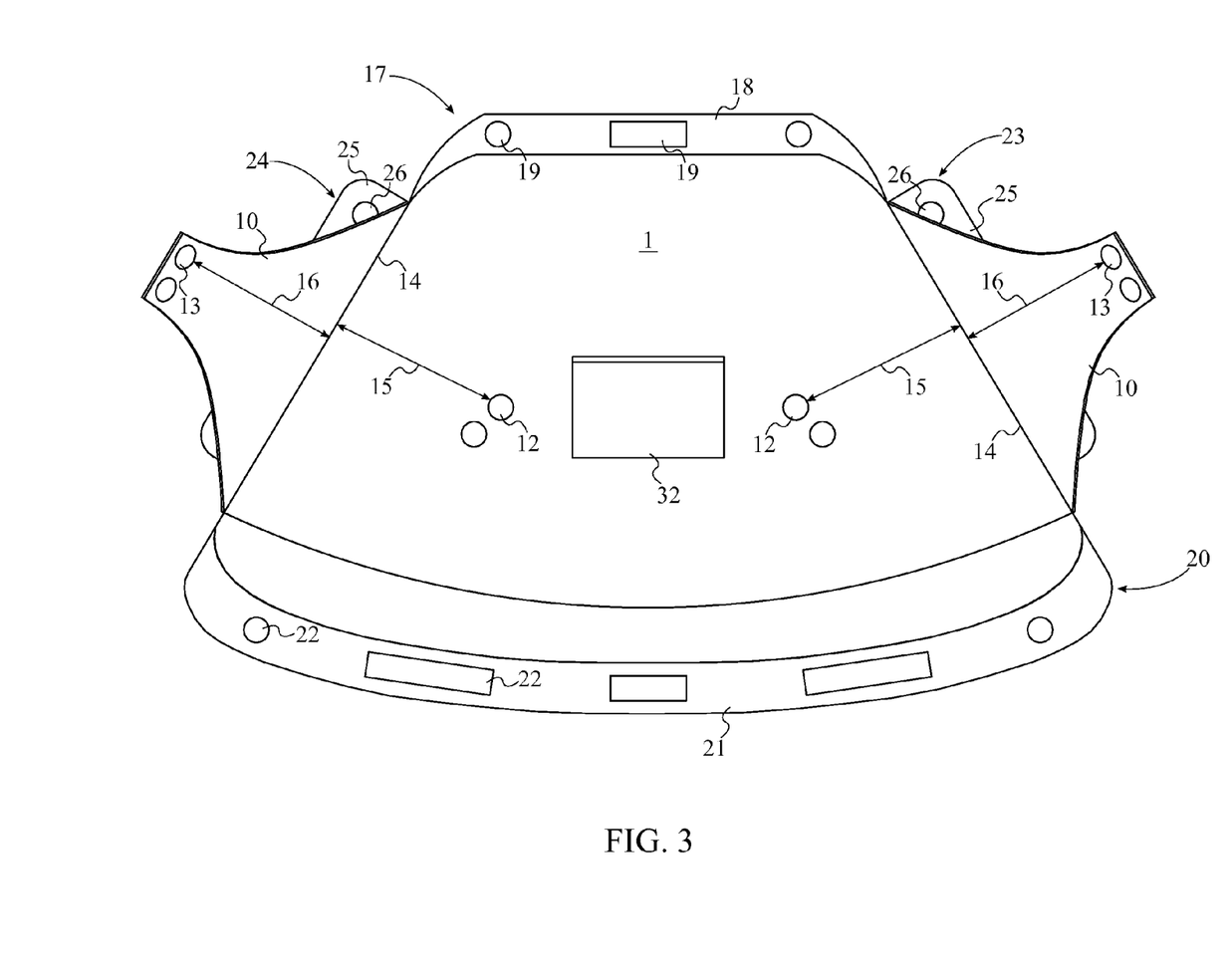
FIG. 3 is a front view of the present invention.
Figure 4:
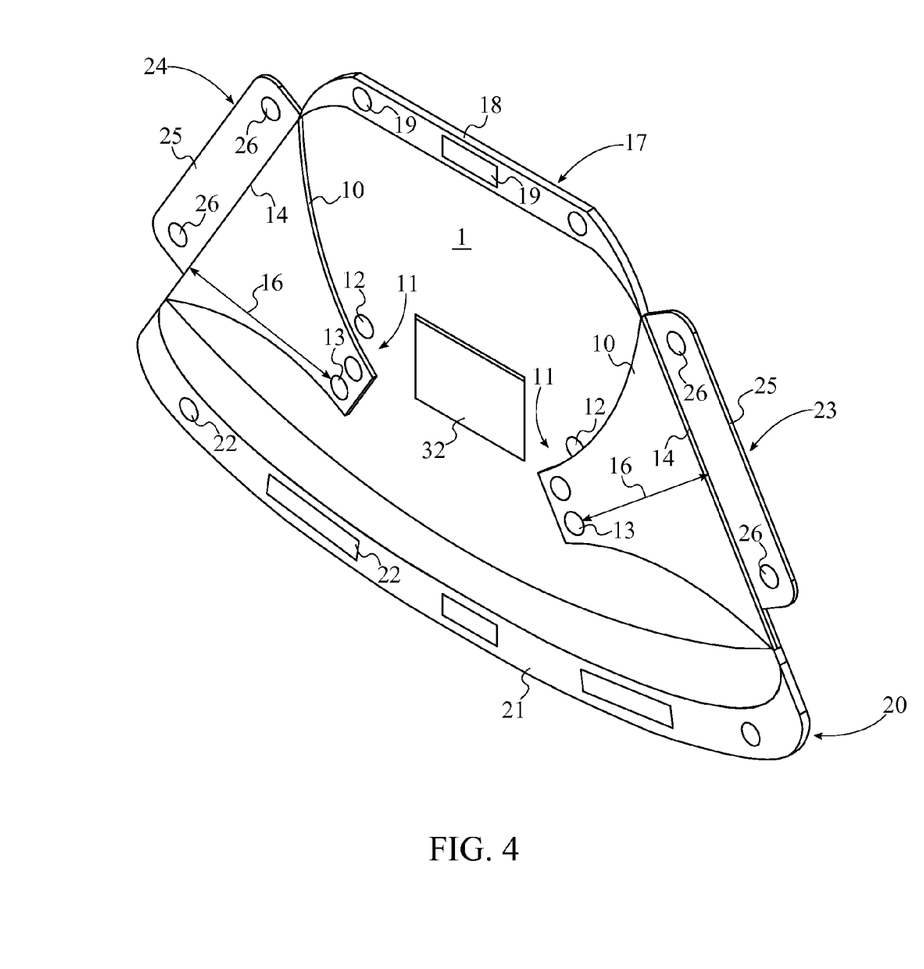
FIG. 4 is an alternate perspective view of the present invention with the at least one securing flap in a folded configuration.
Figure 5:
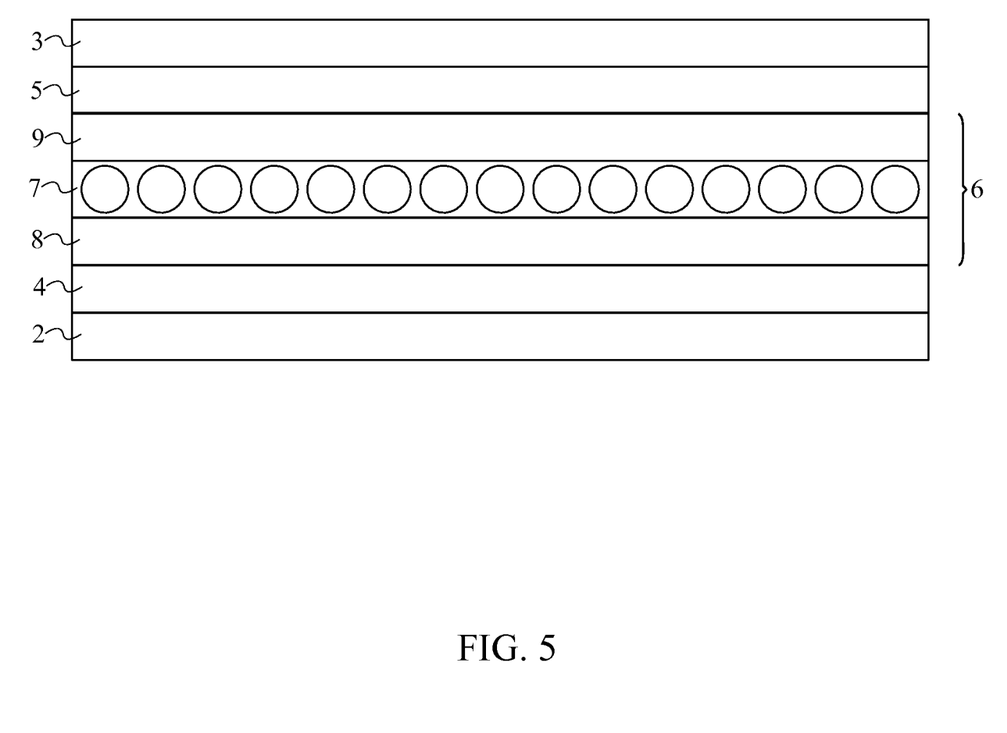
FIG. 5 is a schematic diagram of the multilayer shield.

Referring to FIG. 5, the multilayer shield 1 comprises a first water-repellant layer 2, a second water-repellant layer 3, a first outer heat-reflective layer 4, a second outer heat-reflective layer 5, and at least one intermediate layer 6. The present invention is impermeable to liquids (e.g. precipitation) due to the first water-repellant layer 2 and the second water-repellant layer 3. The first outer heat-reflective layer 4 and the second outer heat-reflective layer 5 serve to reflect ultraviolet light, minimizing light and heat penetration into the interior of the vehicle. Because the multilayer shield 1 is positioned on the exterior of the vehicle, light and heat are unable to penetrate the glass of the vehicle's windshield or windows as is the case with conventional sunshades that are typically positioned within the interior of a vehicle. The at least one intermediate layer 6 provides additional weight and durability to the multilayer shield 1. The at least one intermediate layer 6 may provide further functionality to the present invention such as, but not limited to, increased heat reflectivity and cushioning. The first water-repellant layer 2 is superimposed upon the first outer heat-reflective layer 4. Similarly, the second water-repellant layer 3 is superimposed upon the second outer heat-reflective layer 5. This positioning of the first water-repellant layer 2 and the second water-repellant layer 3 ensures that the first water-repellant layer 2 and the second water-repellant layer 3 are the outermost layers of the multilayer shield 1, preventing liquid from penetrating the multilayer shield 1. The at least one intermediate layer 6 is positioned in between the first outer heat-reflective layer 4 and the second outer heat-reflective layer 5. As such, the at least one intermediate layer 6 is protected from the elements in between the first outer heat-reflective layer 4 and the second outer heat-reflective layer 5.

Figure 10:
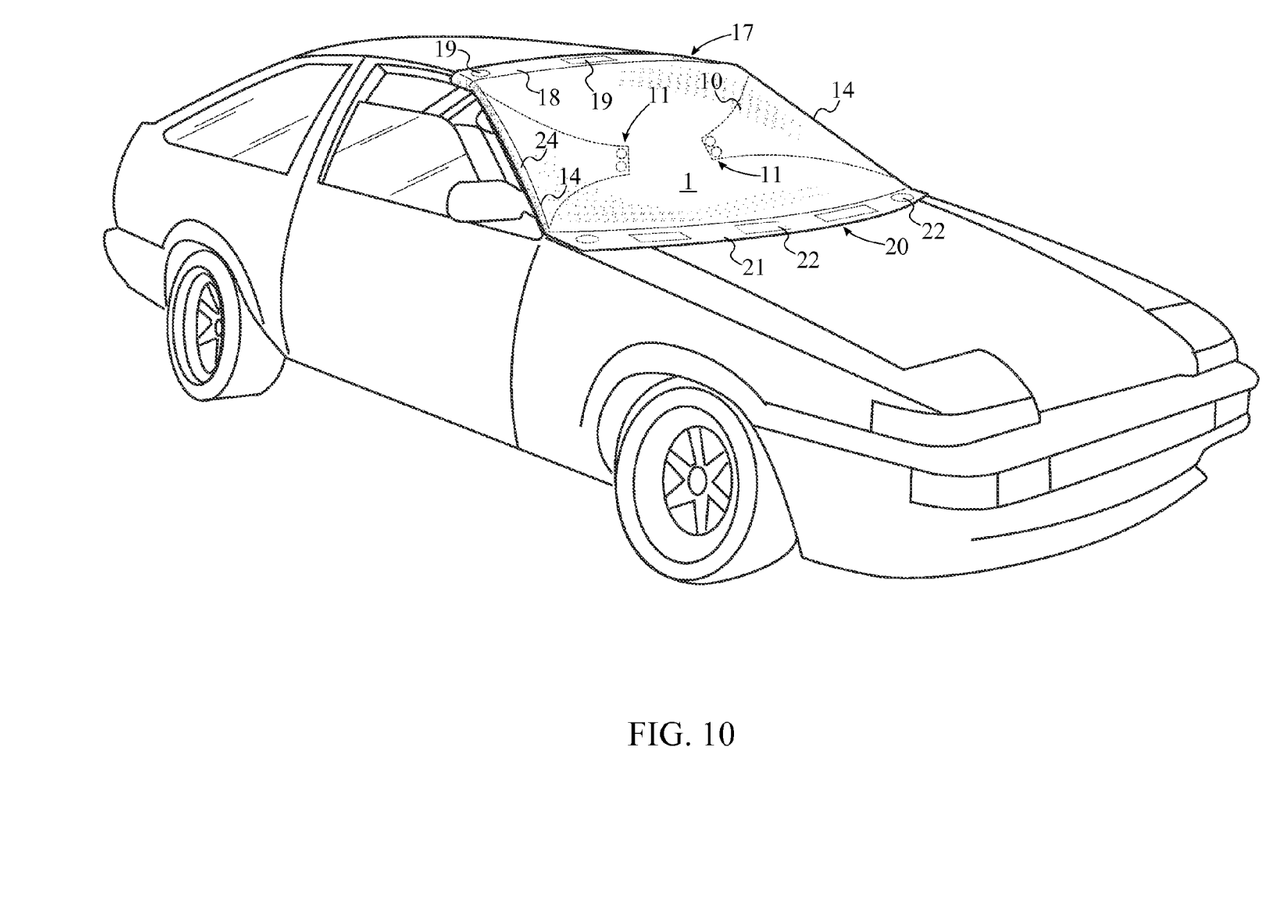
FIG. 10 is a drawing of the present invention mounted to a vehicle windshield.

The at least one securing flap 10 is laterally and foldably connected to the multilayer shield 1. The at least one securing flap 10 is folded into the vehicle interior when securing the present invention to the vehicle as shown in FIG. 10. The at least one magnetic fastener 11 comprises a securing magnet 12 and a flap magnet 13. The securing magnet 12 and the flap magnet 13 utilize a rigid casing that is incorporated into the multilayer shield 1 and the at least one securing flap 10, respectively. The rigid casing prevents the magnets from touching and/or scraping against the vehicle glass or metal. The rigid casing of the securing magnet 12 and the flap magnet 13 is utilized in conjunction with all additional magnets of the present invention as well. The securing magnet 12 is embedded into the multilayer shield 1 in order to improve handling of the present invention when attaching and detaching the present invention from the vehicle. Similarly, the flap magnet 13 is embedded into the at least one securing flap 10 in order to improve handling of the present invention. The securing magnet 12 and the flap magnet 13 are utilized to secure the present invention to both the vehicle exterior and the interior with the securing magnet 12 positioned on the vehicle exterior and the flap magnet 13 positioned on the vehicle interior. This is accomplished through an attractive magnetic force operating through the windshield or window.

Again referring to FIG. 5, in the preferred embodiment of the present invention, the at least one intermediate layer 6 comprises a bubble pack layer 7, a first inner heat-reflective layer 8, and a second inner heat-reflective layer 9. The bubble pack layer 7 provides cushioning as well as additional weight to the present invention. The first inner heat-reflective layer 8 and the second inner heat-reflective layer 9 function similarly to the first outer heat-reflective layer 4 and the second outer heat-reflective layer 5 and serve to minimize light and heat penetration into the vehicle interior. The first outer heat-reflective layer 4 is superimposed upon the first inner heat-reflective layer 8 while the first inner heat-reflective layer 8 is superimposed upon the bubble pack layer 7. As such, the first inner heat-reflective layer 8 is contained and protected in between the first outer heat-reflective layer 4 and the bubble pack layer 7. The bubble pack layer 7 is superimposed upon the second inner heat-reflective layer 9, placing the bubble pack layer 7 in between the first inner heat-reflective layer 8 and the second inner heat-reflective layer 9. The second inner heat-reflective layer 9 is superimposed upon the second outer heat-reflective layer 5. The second inner heat-reflective layer 9 is contained and protected in between the second outer heat-reflective layer 5 and the bubble pack.

Figure 13:
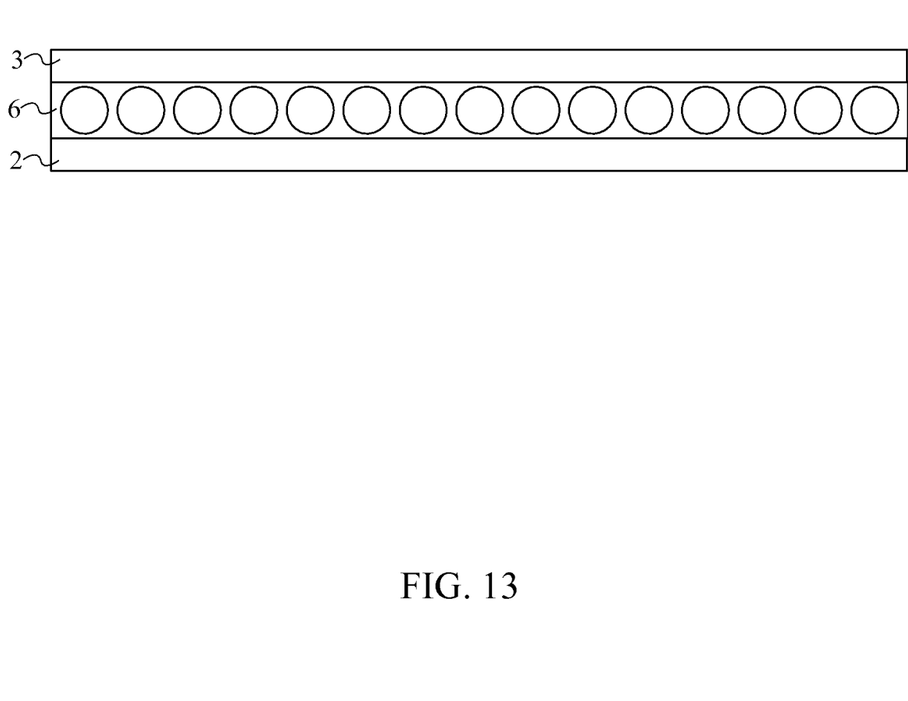
FIG. 13 is a schematic diagram of the multilayer shield in an alternative embodiment of the present invention.

In the side window embodiment of the present invention, the at least one intermediate layer 6 may comprise a mesh layer. The mesh layer allows for visibility into and out of the vehicle through the at least one intermediate layer 6 when the present invention has been placed onto the vehicle. Additionally, the mesh layer provides shade for the interior of the vehicle. The at least one intermediate layer 6 may incorporate multiple properties into a single layer as well. In the alternative embodiment of the present invention shown in FIG. 13, the at least one intermediate layer 6 incorporates heat-reflective properties as well as air bubble properties into a single fused layer.

Again with reference to FIGS. 1-4, the present invention further comprises a creasing fold 14 located at the connection between the at least one securing flap 10 and the multilayer shield 1. The creasing fold 14 allows the at least one securing flap 10 to fold about the creasing fold 14 in order to position a portion of the at least one securing flap 10 within the vehicle interior. A first distance 15 is present in between the securing magnet 12 and the creasing fold 14 while a second distance 16 is present in between the flap magnet 13 and the creasing fold 14. The first distance 15 offsets the securing magnet 12 from the creasing fold 14 in order to allow the securing magnet 12 to align with the flap magnet 13 through the windshield or window glass when the at least one securing flap 10 is folded into the vehicle interior. The second distance 16 similarly offsets the flap magnet 13 from the creasing fold 14. The first distance 15 and the second distance 16 are both oriented perpendicular to the creasing fold 14 as the at least one securing flap 10 is able to fold over the creasing fold 14 into the vehicle interior. The securing magnet 12 is selectively engaged to the flap magnet 13 through the windshield or window glass in order to magnetically secure the present invention to the vehicle. The securing magnet 12 may be separated from the flap magnet 13 when removing the present invention from the vehicle.

The present invention may be attached to the front windshield, the rear windshield, or to one of the side windows of a vehicle. In the front windshield embodiment of the present invention, the present invention further comprises a roof anchor 17. As shown in FIG. 10, the roof anchor is utilized to secure the present invention to the roof of the vehicle. The roof anchor 17 comprises a roof panel 18 and a plurality of roof magnets 19. The roof panel 18 is placed into contact with the roof of the vehicle while the plurality of roof magnets 19 magnetically secures the roof panel 18 to the vehicle roof. The plurality of roof magnets 19 is evenly distributed across the roof panel 18 in order to ensure that the roof panel 18 is securely attached at multiple points to the vehicle roof. The roof panel 18 is laterally connected to the multilayer shield 1 in order to ensure that the edge of the multilayer shield 1 is secured to the vehicle roof. The roof panel 18 is positioned opposite to a hood anchor 20 that is attached to the vehicle hood.

In the front windshield embodiment of the present invention, the hood anchor 20 comprises a hood panel 21 and a plurality of hood magnets 22. The plurality of hood magnets 22 is utilized to magnetically secure the hood panel 21 to the vehicle hood as shown in FIG. 10. The hood panel 21 is placed into contact with the vehicle hood and is laterally connected to the multilayer shield 1, opposite to the roof anchor 17. This ensures that the edge of the multilayer shield 1 opposite to that of the roof anchor 17 is secured to the vehicle hood. The plurality of hood magnets 22 is evenly distributed across the hood panel 21 in order to securely attach the hood panel 21 to the vehicle hood at multiple points.

Again with reference to FIGS. 1-4, the front windshield embodiment of the present invention further comprises a left anchor 23 and a right anchor 24. The left anchor 23 and the right anchor 24 provide two additional points for securing the present invention to the vehicle. More specifically, the left anchor 23 and the right anchor 24 are designed to be attached to the left strut and the right strut of the vehicle, respectively. The left anchor 23 and the right anchor 24 each comprise a strut panel 25 and a plurality of strut magnets 26. The strut panel 25 is placed into contact with the vehicle strut while the plurality of strut magnets 26 is able to magnetically secure the strut panel 25 to the vehicle strut. The strut panel 25 of the left anchor 23 and the strut panel 25 of the right anchor 24 are connected along the creasing fold 14 in order to respectively position the strut panel 25 of the left anchor 23 and the strut panel 25 of the right anchor 24 adjacent to the left strut and the right strut of the vehicle. The strut panel 25 of the left anchor 23 is laterally connected to the multilayer shield 1 while the strut panel 25 of the right anchor 24 is laterally connected to the multilayer shield 1, opposite to the strut panel 25 of the left anchor 23. This further ensures that the edges of the multilayer shield 1 are able to be secured to the vehicle when the present invention is in use. The strut panel 25 of both the left anchor 23 and the right anchor 24 are positioned in between the roof anchor 17 and the hood anchor 20 to more assuredly secure the present invention to the vehicle. The plurality of strut magnets 26 of the left anchor 23 is evenly distributed across the strut panel 25 of the left anchor 23. Similarly, the plurality of strut magnets 26 of the right anchor 24 is evenly distributed across the strut panel 25 of the right anchor 24. This ensures that the left anchor 23 and the right anchor 24 are able to be securely attached to the left strut and the right strut at multiple points.

Figure 6:
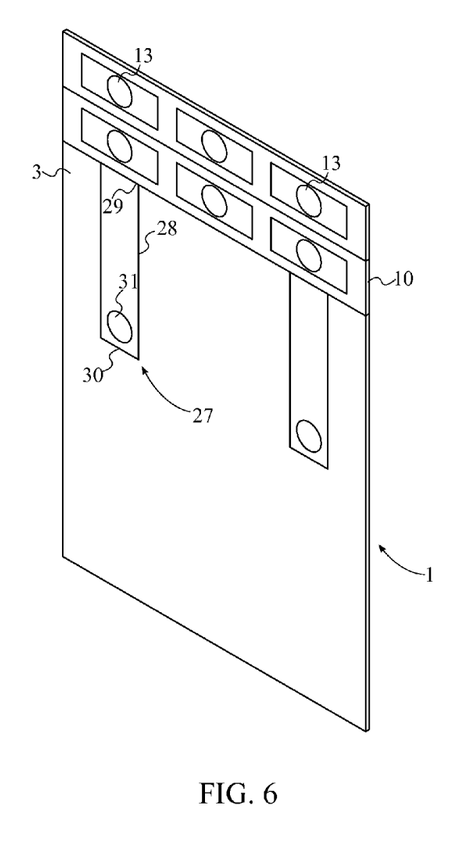
FIG. 6 is a perspective view of a side window embodiment of the present invention in a flattened configuration.
Figure 7:
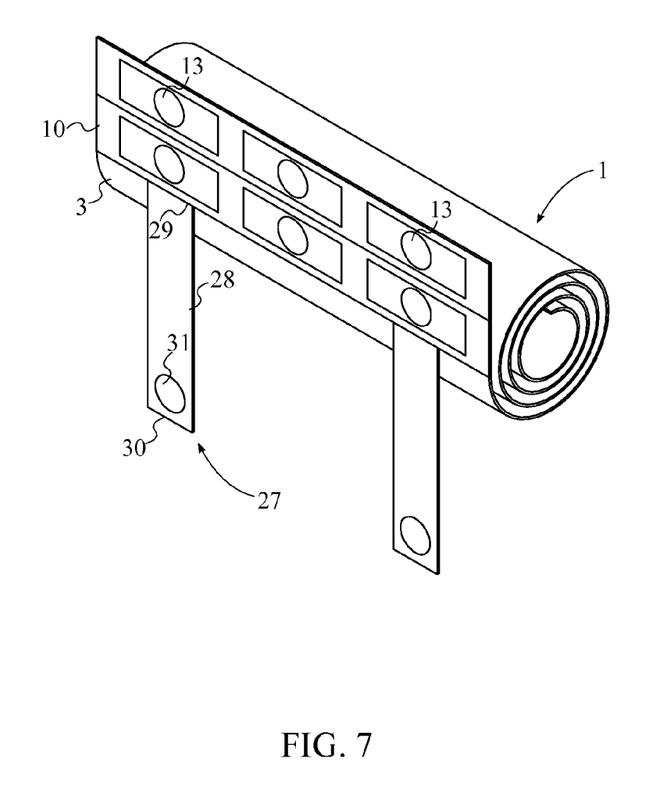
FIG. 7 is a perspective view of the side window embodiment of the present invention in a rolled configuration.
Figure 8:
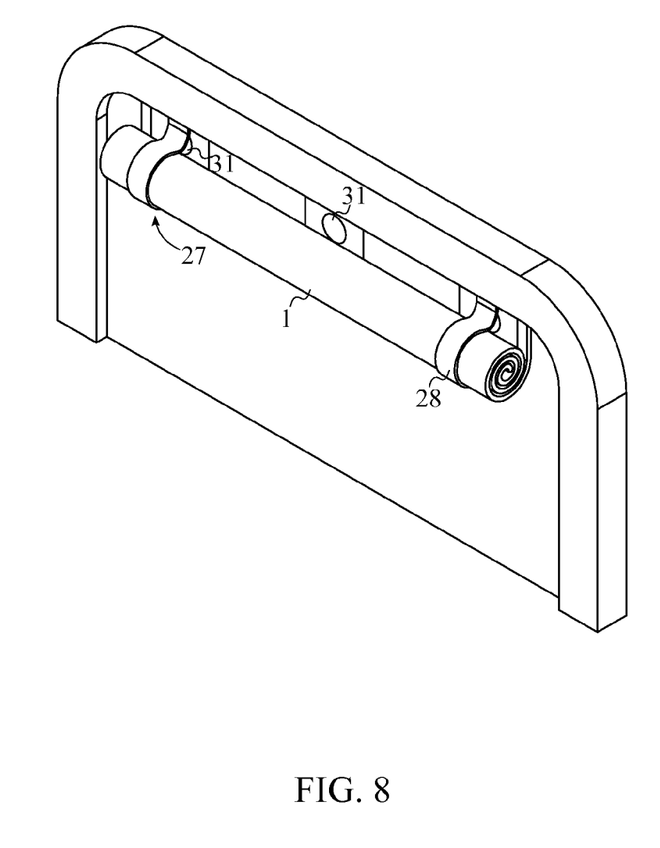
FIG. 8 is a perspective view of the side window embodiment of the present invention in a rolled configuration and attached to a closed vehicle side window.
Figure 9:
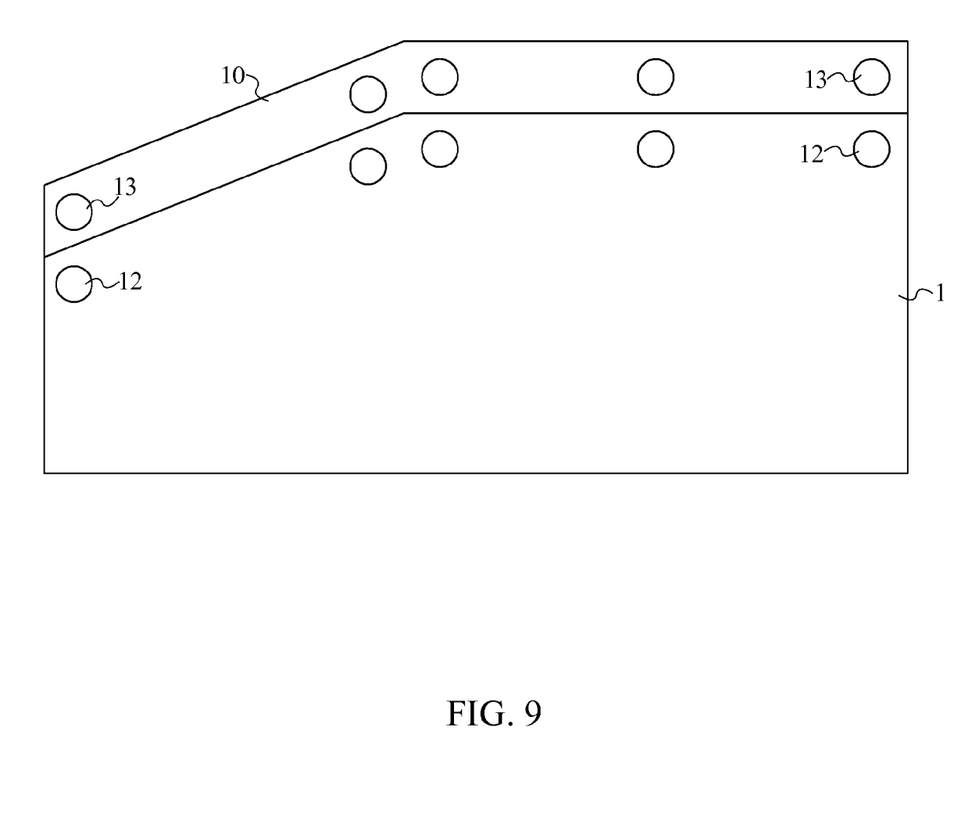
FIG. 9 is a front view of an additional side window embodiment of the present invention.

Referring to FIG. 6-8, in a side window embodiment of the present invention, the present invention further comprises at least one roll-up fastener 27. This embodiment of the present invention is primarily intended for use in covering a driver or passenger window in order to prevent light and heat from entering the interior of a vehicle. This embodiment of the present invention may be utilized in parked vehicles and for protecting vehicle passengers from direct sunlight. Additionally, this embodiment of the present invention may incorporate tinted or mesh material in order to protect drivers and passengers while still allowing the driver a clear view of traffic via mirrors. The at least one roll-up fastener 27 is utilized to secure the present invention in a rolled configuration when the present invention is not in use. The at least one roll-up fastener 27 comprises a strap 28 and a fastening magnet 31. The strap 28 is wrapped around the multilayer shield 1 when the present invention is in a rolled up configuration while the fastening magnet 31 is magnetically attached to the flap magnet 13 in order to hold the at least one roll-up fastener 27 in place. The strap 28 comprises a first end 29 and a second end 30. The strap 28 is not positioned within the multilayer shield 1 and the first end 29 of the strap 28 is connected adjacent to the second water-repellant layer 3 in order to provide convenient access to the strap 28. The first end 29 of the strap 28 is positioned adjacent to the at least one securing flap 10, placing the fastening magnet 31 in close proximity to the flap magnet 13. The fastening magnet 31 is positioned adjacent to the second end 30 of the strap 28. This allows the fastening magnet 31 to be magnetically attached to the flap magnet 13 when the present invention is in a rolled configuration and the strap 28 is wrapped around the multilayer shield 1. The fastening magnet 31 is embedded into the strap 28 in order to facilitate handling of the strap 28. This embodiment of the present invention is secured to the vehicle window from the vehicle interior. The rolling and fastening of this embodiment of the present invention is done from the vehicle interior by the driver or a passenger. When this embodiment of the present invention is in the rolled up configuration, the present invention remains in place within the vehicle as shown in FIG. 8 in order to eliminate the need to remove and roll up the present invention when not in use. Additionally, in this side window embodiment of the present invention, the multilayer shield 1 may comprise alternative layers from those included in the preferred embodiment of the present invention. Example layers utilized in the side window embodiment of the present invention include, but are not limited to, blackout fabric layers, mesh fabric layers, and tinted layers. A coated blackout fabric layer prevents sunlight and heat from penetrating the side window embodiment of the present invention while a mesh fabric layer or tinted layer allows a user to view the surrounding environment without feeling the heat or glare of the sun.

Figure 11:
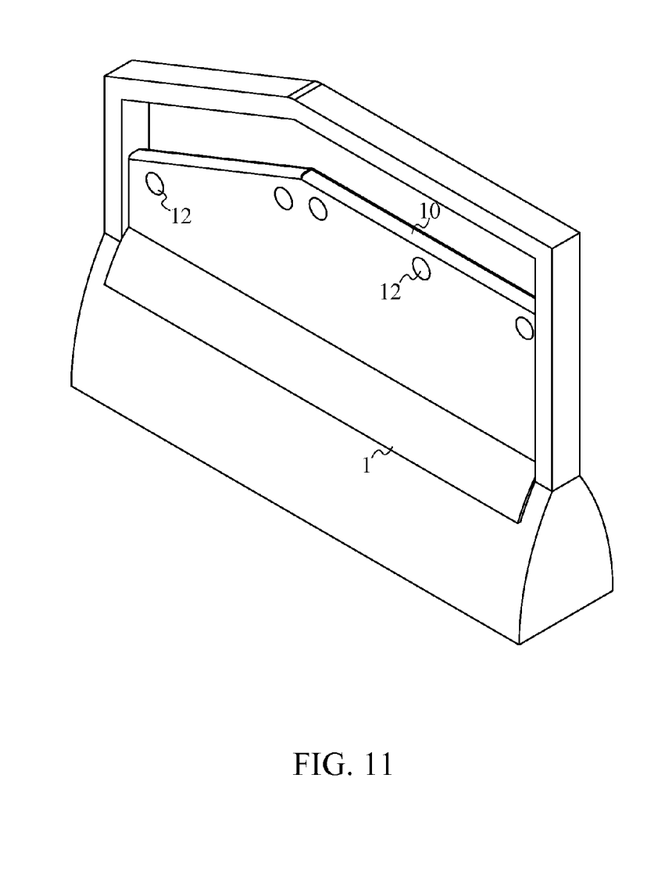
FIG. 11 is a perspective view of a side window embodiment of the present invention mounted to a partially open vehicle side window.
Figure 12:
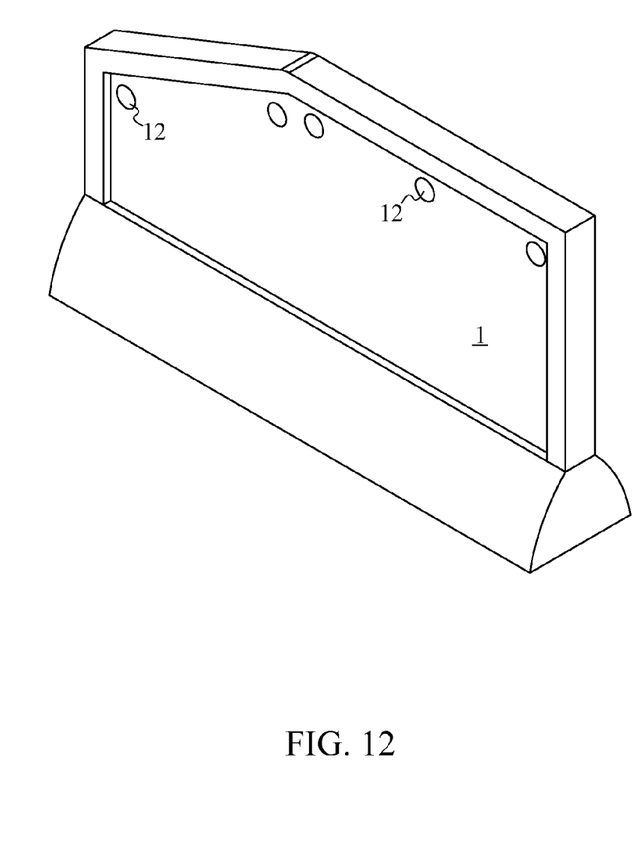
FIG. 12 is a perspective view of a side window embodiment of the present invention mounted to a closed vehicle side window.

An additional side window embodiment of the present invention is shown in FIG. 8. The securing magnet 12 and the flap magnet 13 of the at least one magnetic fastener 11 are utilized in order to secure the at least one securing flap 10 and the multilayer shield 1 to each other through the window glass. When attaching this additional side window embodiment of the present invention to a vehicle side window, the window is first partially opened. The method of attaching this additional side window embodiment of the present invention is shown in FIG. 11 and FIG. 12. As shown in FIG. 11, the at least one securing flap 10 is folded over the upper edge of the window. The securing magnet 12 and the flap magnet 13 are utilized to hold the at least one securing flap 10 in place. The vehicle window may then be fully closed as shown in FIG. 12, leaving the present invention in place on the window.

In addition to providing protection against vehicle interior damage due to sunlight and heat, the present invention additionally is able to complement, improve, and otherwise alter the aesthetic appearance of the present invention and the vehicle to which the present invention is attached. Again with reference to FIGS. 1-4, the present invention further comprises a display pocket 32 that may be utilized to hold an advertisement, vehicle fact sheet, decoration, or similar item on the present invention. As such, the display pocket 32 may be utilized in a commercial environment to provide details of a vehicle that is for sale and to provide information about the vehicle. In a residential setting, the display pocket 32 may be utilized to hold and display a resident's parking permit. The display pocket 32 is integrated into the multilayer shield 1 in order to place the item within the display pocket 32 in close proximity to the multilayer shield 1. The display pocket 32 is translucent and is positioned centrally on the multilayer shield 1 as well in order to place the display pocket 32 into prominent view on the multilayer shield 1.

While the present invention is primarily intended for use in protecting a vehicle interior from heat and sunlight damage, the present invention additionally serves to protect the vehicle windshield as well. The multilayer shield 1 provides protection against various forms of precipitation such as snow and sleet in order to prevent snow from accumulating on the windshield and to prevent ice from forming on the windshield. The first water-repellant layer 2 and the second water-repellant layer 3 prevent precipitation from coming into contact with the windshield. The additional weight and sturdiness provided by the at least one intermediate layer 6 increases the present invention's resistance to snow and water. As such, the present invention may simply be removed from the vehicle's windshield after snowfall, eliminating the need for the user to scrape ice, wipe water, and otherwise clean the windshield.

Although the present invention has been explained in relation to its preferred embodiment, it is understood that many other possible modifications and variations can be made without departing from the spirit and scope of the invention as hereinafter claimed.

What is claimed is:

1. A protective vehicle cover comprises:
   a multilayer shield;
   at least one securing flap;
   at least one magnetic fastener;
   the multilayer shield comprises a first water-repellant layer, a second water-repellant layer, a first outer heat-reflective layer, a second outer heat-reflective layer, and at least one intermediate layer;
   the at least one magnetic fastener comprises a securing magnet and a flap magnet;
   the first water-repellant layer being superimposed upon the first outer heat-reflective layer;
   the second water-repellant layer being superimposed upon the second outer heat-reflective layer;
   the at least one intermediate layer being positioned in between the first outer heat-reflective layer and the second outer heat-reflective layer;
   the at least one securing flap being laterally and foldably connected to the multilayer shield;
   the securing magnet being embedded-into the multilayer shield;
   the flap magnet being embedded into the at least one securing flap;
   a left anchor;
   a right anchor;
   the left anchor and the right anchor each comprise a strut panel and a plurality of strut magnets;
   the strut panel of the left anchor being laterally connected to the multilayer shield;
   the strut panel of the right anchor being laterally connected to the multilayer shield, opposite to the strut panel of the left anchor;
   the strut panel of both the left anchor and the right anchor being positioned in between a roof anchor and a hood anchor;
   the plurality of strut magnets of the left anchor being evenly distributed across the strut panel of the left anchor; and
   the plurality of strut magnets of the right anchor being evenly distributed across the strut panel of the right anchor.

2. The protective vehicle cover as claimed in claim 1 further comprises:
   the at least one intermediate layer comprises a bubble pack layer, a first inner heat-reflective layer, and a second inner heat-reflective layer;
   the first outer heat-reflective layer being superimposed upon the first inner heat-reflective layer;
   the first inner heat-reflective layer being superimposed upon the bubble pack layer;
   the bubble pack layer being superimposed upon the second inner heat-reflective layer; and
   the second inner heat-reflective layer being superimposed upon the second outer heat-reflective layer.

3. The protective vehicle cover as claimed in claim 1, wherein the at least one intermediate layer being a mesh layer.

4. The protective vehicle cover as claimed in claim 1 further comprises:
   a creasing fold being located at the connection between the at least one securing flap and the multilayer shield;
   a first distance between the securing magnet and the creasing fold;
   the first distance being oriented perpendicular to the creasing fold;
   a second distance between the flap magnet and the creasing fold;
   the second distance being oriented perpendicular to the creasing fold; and
   the securing magnet being selectively engaged to the flap magnet.

5. The protective vehicle cover as claimed in claim 1 further comprises:
   the roof anchor comprises a roof panel and a plurality of roof magnets;
   the roof panel being laterally connected to the multilayer shield, opposite to the hood anchor; and
   the plurality of roof magnets being evenly distributed across the roof panel.

6. The protective vehicle cover as claimed in claim 1 further comprises:
   the hood anchor comprises a hood panel and a plurality of hood magnets;
   the hood panel being laterally connected to the multilayer shield, opposite the roof anchor; and
   the plurality of hood magnets being evenly distributed across the hood panel.

7. The protective vehicle cover as claimed in claim 1 further comprises:
   the strut panel of the left anchor being connected along a creasing fold, wherein the creasing fold is located at the connection between the at least one securing flap and the multilayer shield.

8. The protective vehicle cover as claimed in claim 1 further comprises:
   the strut panel of the right anchor being connected along a creasing fold, wherein the creasing fold is located at the connection between the at least one securing flap and the multilayer shield.

9. The protective vehicle cover as claimed in claim 1 further comprises:
   at least one roll-up fastener;
   the at least one roll-up fastener comprises a strap and a fastening magnet;
   a first end of the strap being connected adjacent to the second water-repellant layer;
   the first end of the strap being positioned adjacent to the at least one securing flap;
   the fastening magnet being embedded into the strap; and
   the fastening magnet being positioned adjacent to a second end of the strap.

10. The protective vehicle cover as claimed in claim 1 further comprises:
    a display pocket;
    the display pocket being integrated into the multilayer shield; and
    the display pocket being positioned centrally on the multilayer shield.

11. A protective vehicle cover comprises:
a multilayer shield;
at least one securing flap;
at least one magnetic fastener;
a display pocket;
the multilayer shield comprises a first water-repellant layer, a second water-repellant layer, a first outer heat-reflective layer, a second outer heat-reflective layer, and at least one intermediate layer;
the at least one magnetic fastener comprises a securing magnet and a flap magnet;
the at least one intermediate layer comprises a bubble pack layer, a first inner heat-reflective layer, and a second inner heat-reflective layer;
the first water-repellant layer being superimposed upon the first outer heat-reflective layer;
the second water-repellant layer being superimposed upon the second outer heat-reflective layer;
the at least one intermediate layer being positioned in between the first outer heat-reflective layer and the second outer heat-reflective layer;
the at least one securing flap being laterally and foldably connected to the multilayer shield;
the securing magnet being embedded-into the multilayer shield;
the flap magnet being embedded into the at least one securing flap;
the first outer heat-reflective layer being superimposed upon the first inner heat-reflective layer;
the first inner heat-reflective layer being superimposed upon the bubble pack layer;
the bubble pack layer being superimposed upon the second inner heat-reflective layer;
the second inner heat-reflective layer being superimposed upon the second outer heat-reflective layer;
the display pocket being integrated into the multilayer shield;
the display pocket being positioned centrally on the multilayer shield;
a left anchor;
a right anchor;
the left anchor and the right anchor each comprise a strut panel and a plurality of strut magnets;
the strut panel of the left anchor being laterally connected to the multilayer shield;
the strut panel of the right anchor being laterally connected to the multilayer shield, opposite to the strut panel of the left anchor;
the strut panel of both the left anchor and the right anchor being positioned in between a roof anchor and a hood anchor;
the plurality of strut magnets of the left anchor being evenly distributed across the strut panel of the left anchor; and
the plurality of strut magnets of the right anchor being evenly distributed across the strut panel of the right anchor.

12. The protective vehicle cover as claimed in claim 11, wherein the at least one intermediate layer being a mesh layer.

13. The protective vehicle cover as claimed in claim 11 further comprises:
a creasing fold being located at the connection between the at least one securing flap and the multilayer shield;
a first distance between the securing magnet and the creasing fold;
the first distance being oriented perpendicular to the creasing fold;
a second distance between the flap magnet and the creasing fold;
the second distance being oriented perpendicular to the creasing fold; and
the securing magnet being selectively engaged to the flap magnet.

14. The protective vehicle cover as claimed in claim 11 further comprises:
the roof anchor comprises a roof panel and a plurality of roof magnets;
the roof panel being laterally connected to the multilayer shield, opposite to the hood anchor; and
the plurality of roof magnets being evenly distributed across the roof panel.

15. The protective vehicle cover as claimed in claim 11 further comprises:
the hood anchor comprises a hood panel and a plurality of hood magnets;
the hood panel being laterally connected to the multilayer shield, opposite the roof anchor; and
the plurality of hood magnets being evenly distributed across the hood panel.

16. The protective vehicle cover as claimed in claim 11 further comprises:
the strut panel of the left anchor being connected along a creasing fold, wherein the creasing fold is located at the connection between the at least one securing flap and the multilayer shield.

17. The protective vehicle cover as claimed in claim 11 further comprises:
the strut panel of the right anchor being connected along a creasing fold, wherein the creasing fold is located at the connection between the at least one securing flap and the multilayer shield.

18. The protective vehicle cover as claimed in claim 11 further comprises:
at least one roll-up fastener;
the at least one roll-up fastener comprises a strap and a fastening magnet;
a first end of the strap being connected adjacent to the second water-repellant layer;
the first end of the strap being positioned adjacent to the at least one securing flap;
the fastening magnet being embedded into the strap; and
the fastening magnet being positioned adjacent to a second end of the strap.

* * * * *